Jan. 19, 1960 C. C. WALTERS 2,921,699
CHARGING MECHANISM FOR AN ENCLOSURE
Filed April 4, 1957 6 Sheets-Sheet 1
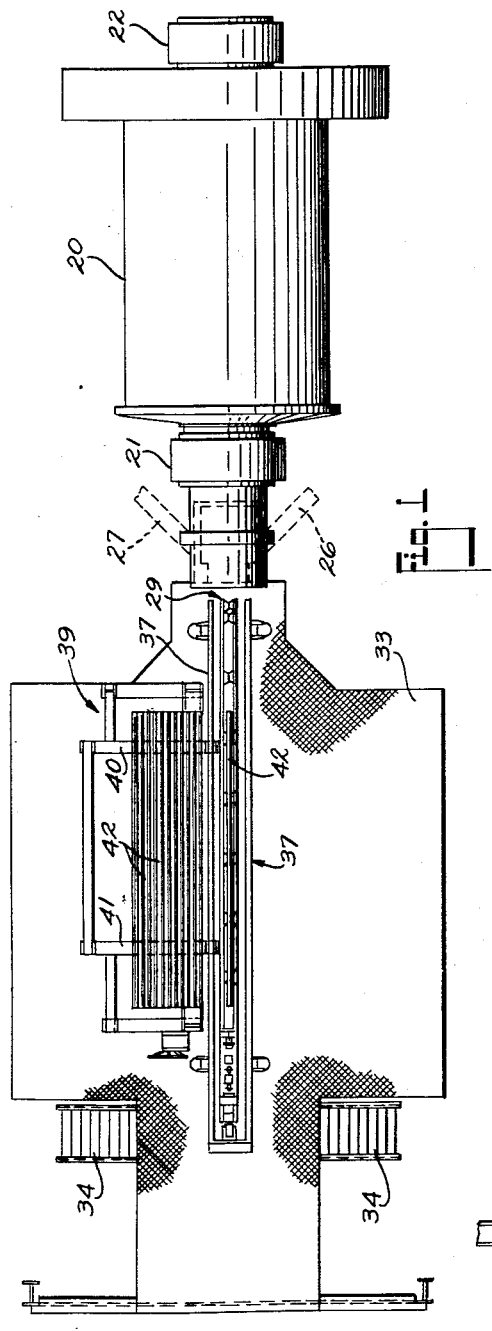
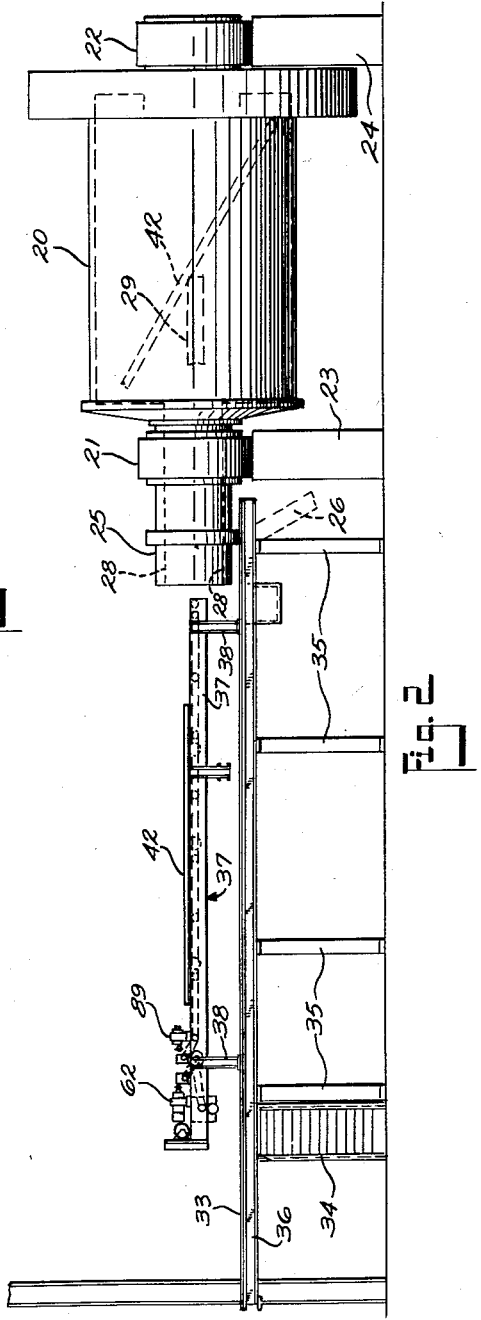
INVENTOR.
CLARENCE C. WALTERS
BY
Hyde, Meyer, Baldwin & Doran
ATTORNEYS

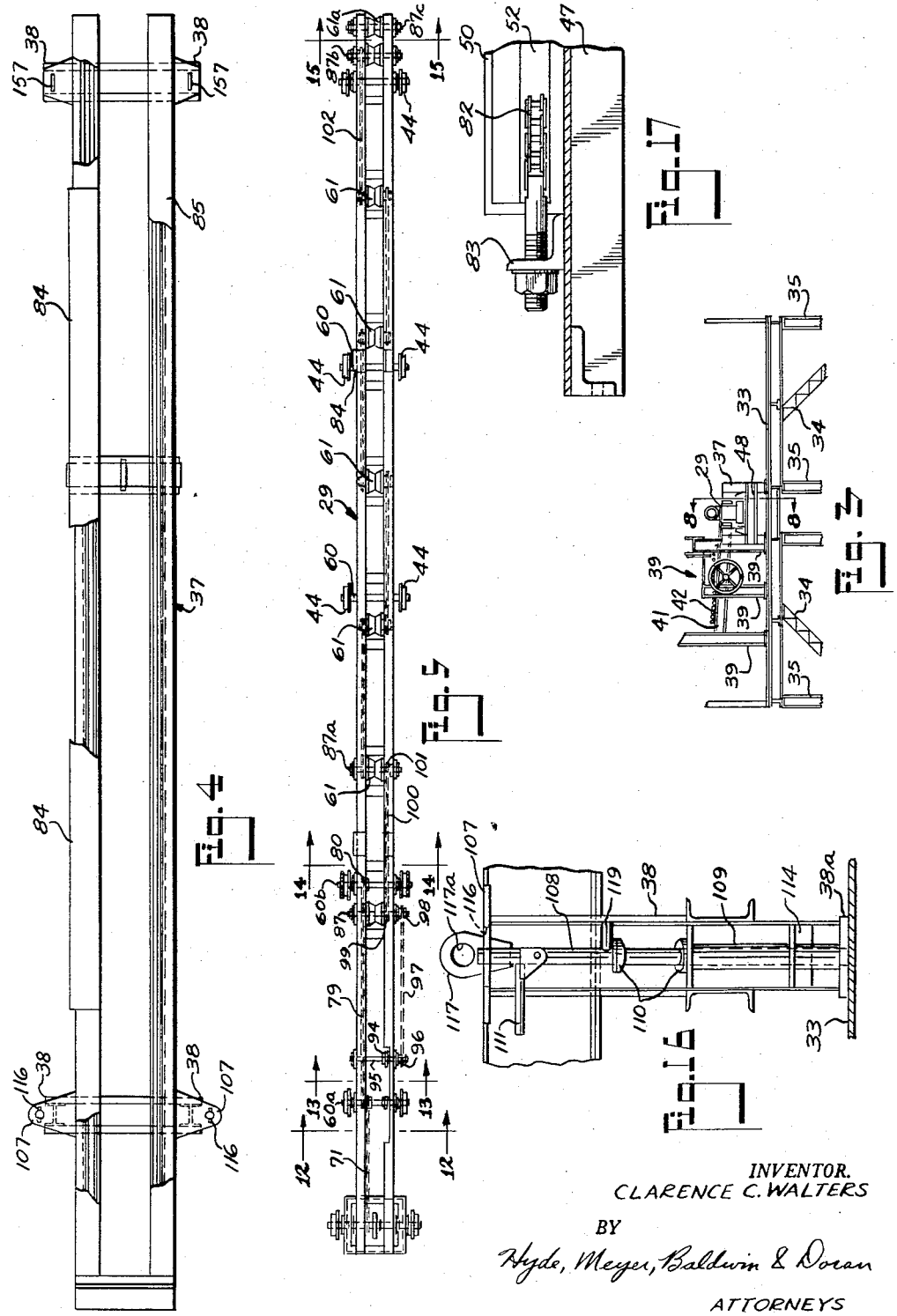

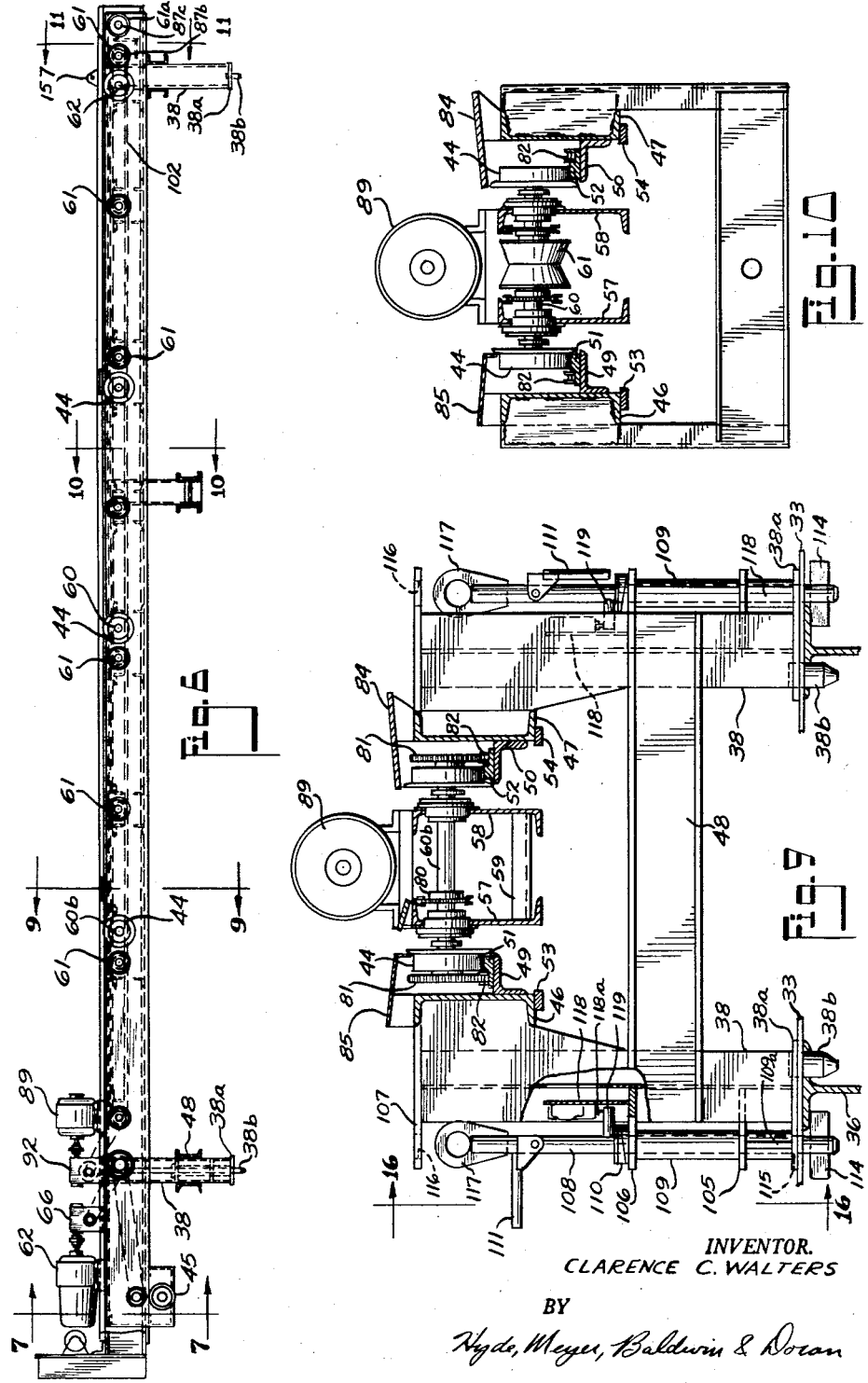

INVENTOR.
CLARENCE C. WALTERS

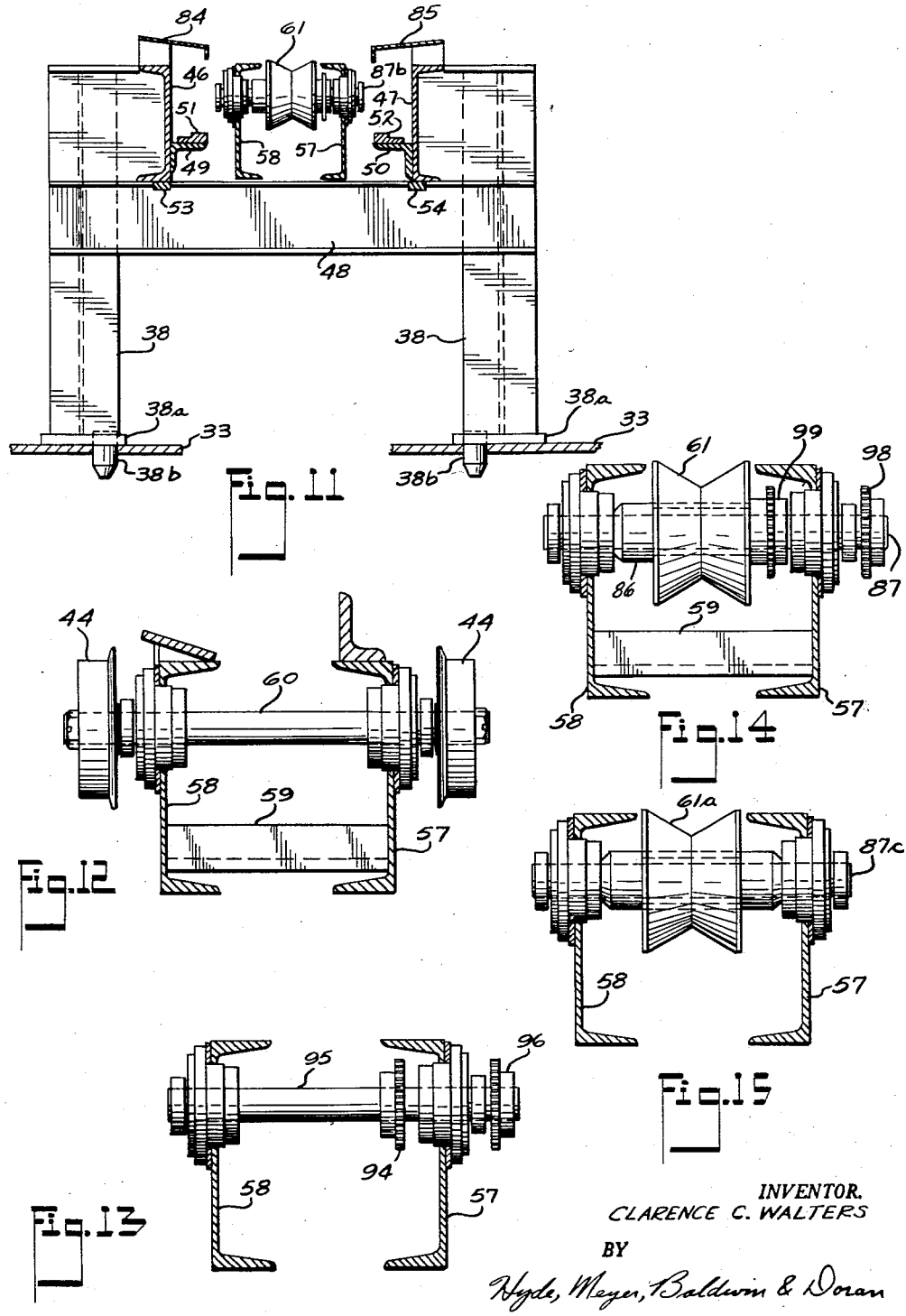

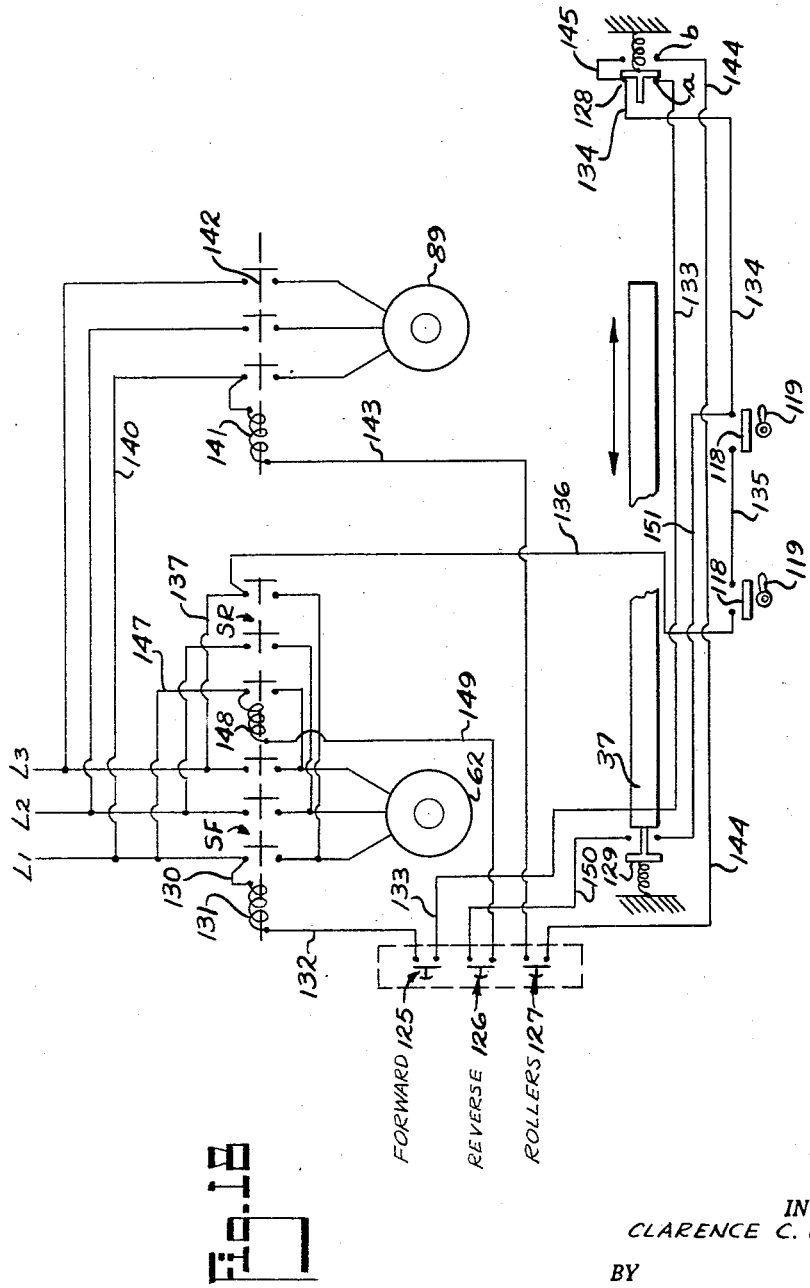

United States Patent Office 2,921,699
Patented Jan. 19, 1960

2,921,699

CHARGING MECHANISM FOR AN ENCLOSURE

Clarence C. Walters, Willoughby, Ohio, assignor to Republic Steel Corporation, Cleveland, Ohio, a corporation of New Jersey Application April 4, 1957, Serial No. 650,793

12 Claims. (Cl. 214—1)

This invention relates to novel and improved means for charging elongated members such as rods, bars, rails, or the like into an enclosure having an opening in the end thereof. By way of exemplification, and not of limitation, it will be illustrated and described with reference to the feeding of elongated rods or bars through an opening in the end wall of what is conventionally termed a rod mill.

Those skilled in the art of grinding and crushing material are familiar with the construction and operation of a rod mill. Briefly, it comprises a drum-like enclosure of substantial size having means for rotating it on a fixed horizontal axis. In one embodiment in connection with which the present invention has been successfully practiced, the enclosure is about sixteen feet long, and about ten feet in diameter and the bars to be inserted in the enclosure are slightly shorter than the length of the enclosure, and are about six inches in diameter.

The material to be ground, for example fragments of ore an inch or less in greatest dimension, is fed into the enclosure which contains a number of cylindrical bars lying loosely in the bottom thereof. The enclosure is rotated at a speed such that the material and the bars are intermingled and tumbled. In a practical application, taconite ore discharged from crushers is conveyed to the feed end of the rotating mill and ground product issues from the discharge end, and may thereafter be screened, the oversize pieces being returned to the feed end.

The material to be ground is often of extreme hardness, such as taconite ore for example, and even though hardened steel rods are used, the rods wear away rather rapidly and must be periodically replaced. Normally worn rod pieces are self ejecting, moving out with the ground material, so that the mill may be maintained in continuous operation with just a short pause for the charging operation to be later described. The apparatus to be described, can, of course, be used to charge any elongated element into any open-end enclosure, and those skilled in the art will at once realize that heat treating or annealing furnaces can be charged in the manner hereinafter illustrated and described.

An object of the present invention is to provide charging means having a portion insertible longitudinally into an open ended enclosure, said portion carrying thereon an elongated element to be discharged within the enclosure, and further carrying thereon additional means for ejecting said element.

A further object of the invention is to provide means as defined in the last preceding paragraph which can be operated even though the enclosure is being rotated on an axis substantially co-incident with the insertible portion of the charging means, if the operation within the enclosure is sufficiently quiescent to permit insertion of the charging means. In rod mills it is usually advisable to operate the charging device when the mill is at rest.

A further object of the invention is to provide means of the character defined in the last two preceding paragraphs which can be readily brought to charging position for operation, and removed therefrom when not needed, and which is provided with safety control means rendering it operative only when it is properly aligned in the aforesaid charging position.

Other objects and advantages will be apparent from a study of the following description, in conjunction with the accompanying drawings illustrating one exemplification of the invention, wherein:

Fig. 1 is a top plan view of an assembly comprising a rod mill, a comminuted material distributor, rod charging means, and rod loading means for delivering individual rods to the charging means.

Fig. 2 is a side elevational view of the assembly shown in Fig. 1, but with the rod loading means omitted.

Fig. 3 is an end elevational view as seen from the left end of Fig. 1, but not showing the rod mill itself.

Fig. 4 is a top plan view, with parts broken away, showing the fixed frame portion for the charging device on a somewhat larger scale than shown in Fig. 1.

Fig. 5 is a top plan view showing the movable carriage portion for the charging device, but with motors omitted. This carriage is reciprocable endwise towards the right on the fixed frame of Fig. 4.

Fig. 6 is a side elevational view of the carriage of Fig. 5 assembled in the frame of Fig. 4.

Figure 7:
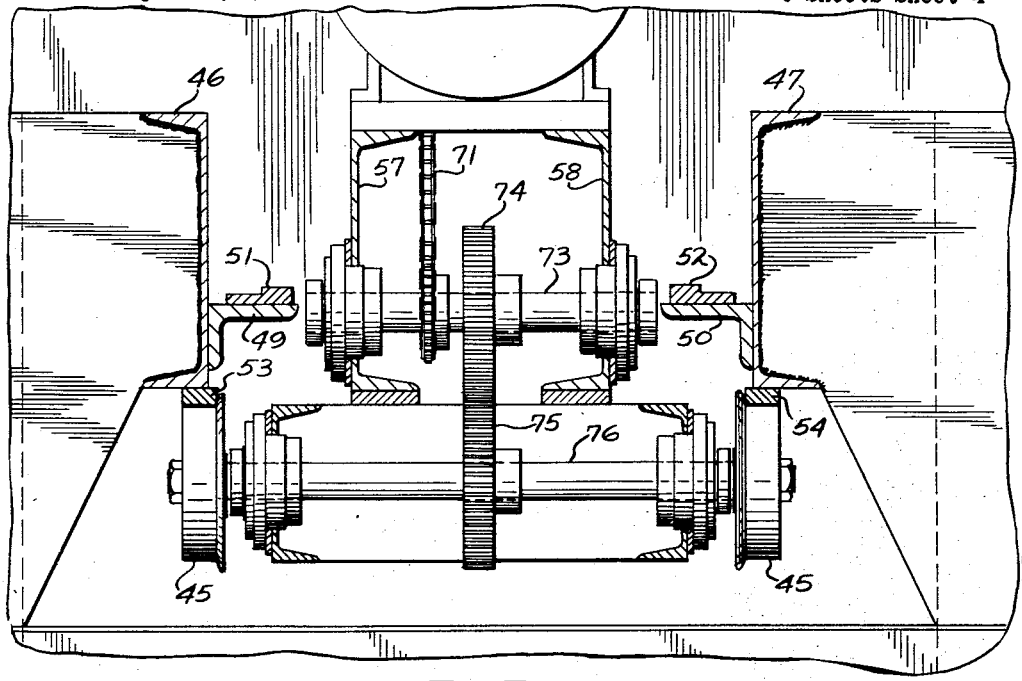
Fig. 7 is a sectional view, further enlarged, taken on the plane of line 7—7 of Fig. 6.
Figure 8:
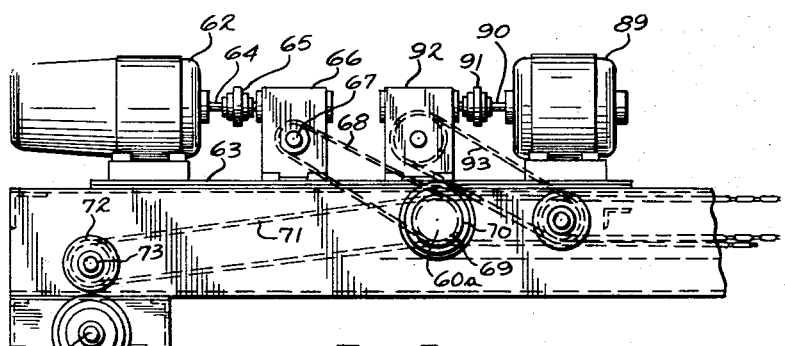
Fig. 8 is a side elevational view taken on the line 8—8 of Fig. 3, but on a somewhat larger scale.

Figs. 9, 10 and 11 are detailed vertical sectional views, somewhat enlarged, taken respectively on the planes of the lines 9—9, 10—10, and 11—11 of Fig. 6.

Figs. 12, 13, 14 and 15 are detailed vertical sectional views, somewhat enlarged, taken respectively on the planes of the lines 12—12, 13—13, 14—14 and 15—15 of Fig. 5.

Fig. 16 is a side elevational view showing details of the frame locking mechanism, as seen from the location of the line 16—16 of Fig. 9.

Fig. 17 is a detail view of the traction chain securing means.

Fig. 18 is an electric wiring diagram showing the control system for the charging device, some parts being indicated schematically.

*General description*

Speaking first generally, to identify the main elements comprising the invention and other elements collaborating therewith, there is shown in Figs. 1 and 2 a rod mill 20. The mill is rotatable in bearings (not shown) beneath collars 21 and 22, being supported on piers 23 and 24. Located axially through collar 22 is a port through which ore is delivered to mill 20. Water is added when wet grinding. At the left end of the mill is a so-called "splitter" 25 which in the present instance divides the ground product of the mill to chutes represented by the broken line elements 26 and 27, the product being thereby carried to further comminuting units such as ball mills, magnetic separators, or the like.

For the purpose of this description it will be noted that although the ground material passes outwardly through an aperture in the left end of mill 20, and into splitter 25, this left end of the mill and the splitter provide an axial opening indicated by broken lines 28 in Fig. 2, said opening having adequate clearance to admit the movable carriage 29 (Figs. 1 and 5) whereby rods are charged into the mill. Reference will therefore hereinafter be made to the 'rod-charging' aperture as referring to the axial one between lines 28 and 29 as seen in Fig. 2. At the right end of the mill, within fixed peripheral guard housing 30, is a mill rotating means comprising a ring gear attached to the rotatable mill body and driven by a pinion with reduction gearing. A conventional driving motor for the pinion is also provided, but is not here shown.

The rod charging means is supported on a platform 33 accessible by means of steps 34 and supported by fixed columns 35 through intermediate I-beams 36. Said rod charging means includes the movable carriage 29 heretofore mentioned, said carriage being supported in a fixed frame 37 38. The frame 37 and carriage 29 are clearly shown in top plan view in Figs. 4 and 5 respectively.

The rod loading rack 39 is a convenient accessory but is not an essential part of the invention. It consists of a fixed stand having vertical legs which support a pair of spaced, slightly inclined beams 40 and 41 on which are stacked a supply of rods 42. A rod release mechanism which delivers one rod at a time, as desired, is operated by hand wheel 43. It allows a rod to roll on to carriage 29, and one rod 42 is shown on the carriage in Figs. 1 and 2.

The charger frame

The rod charging apparatus will now be described in greater detail with special reference to Figs. 4 to 15. It consists of the frame 37 which is essentially a fixed pair of tracks (being fixed in the sense that it is maintained immovable while in use) and a carriage 29 which as heretofore noted is movable endwise on frame 37. The frame includes a pair of spaced, parallel channel members 46, 47 supported by four legs 38 at its ends and these legs are braced by cross members 48 (Figs. 9 and 11). Legs 38 have feet 38a which rest on the platform, and each foot is provided with a downwardly extending pin 38b which is insertible through a respective locating hole in the platform to align the charging device in working relationship to the rod mill.

Channel members 46, 47 carry respective angle iron track supports 49 and 50 which in turn support upper tracks or rails 51 and 52 (Figs. 9, 10 and 11). These tracks and their supports extend substantially the full length of the frame 37 and they provide a runway for the wheels 44 of carriage 29. Subsidiary lower track members 53 and 54 are provided on the under side of channels 46 and 47 and they afford stabilizing tracks for a pair of carriage wheels 45 (Figs. 6, 7 and 8) which run thereunder to prevent up-ending of the left end of the carriage when it is extended to its maximum distance forwardly, namely to the right in Figs. 1, 2 and 6.

The carriage

The carriage 29 (Fig. 5) comprises a pair of inwardly concave structural steel channel members 57 and 58 spaced and braced both by occasional cross pieces 59 (Figs. 9, 12 and 14) and also by the various transverse axles 60 which carry wheels 44. The axles are free to rotate in suitable bearing, packing, and retaining assemblies in the channel members 57 and 58 in any suitable manner not here necessary to describe.

There are two actual driving axles, one 60a (Figs. 5 and 8) for the lower or stabilizing wheels 45 and another 60b (Figs. 5 and 6) for the main carriage drive.

A reversible motor 62 (Figs. 6 and 8), which is mounted on a plate 63 on top of the carriage, drives a shaft 64 and thence through coupling 65 and a speed reduction gearing 66 operates drive shaft 67 and sprocket chain 68. This chain engages a sprocket 69 on axle 60a and from this axle another sprocket 70 drives link chain 71 which engages a sprocket 72 on an intermediate shaft 73 (Fig. 7). Shaft 73 through meshed gears 74, 75 drives the stabilizing axle 76 which carries stabilizing wheels 45 hereinabove referred to.

The carriage drive

The main carriage drive (Figs. 5, 6 and 14) is from driven axle 60a referred to in the last preceding paragraph and through a horizontal sprocket chain 79 to a sprocket 80 (Fig. 9) which is pinned to its axle 60b. At the outer ends of axle 60b are other sprockets 81 which engage respective stretched link chains 82 (Figs. 9 and 17) extending between stops 83 at opposite ends of the frame on lower ledges of tracks 51 and 52. These link chains have for simplicity been omitted from most of the drawings. They provide non-slip traction for driving axle 60b.

It is now apparent that forward and reverse rotation of reversible motor 62 produces suitable movement of carriage 29. By reason of the stabilizing effect of wheels 45, the carriage can be extended inwardly from frame 37 a quite substantial distance into mill 20, as indicated by the broken line showing 29 within the mill in Fig. 2. Safety limit switches stop the carriage at a predetermined limit of travel in both directions, as will be explained later in connection with the wiring diagram, Fig. 18.

When carriage 29 reaches its furthest extent of movement into mill 20, it ejects and drops the rod carried thereon by means now to be described.

The ejector roll drive

The carriage carries a number of rollers 61 hereinabove mentioned. Each roller has a recessed or notched periphery to receive and retain a rod 42 when placed thereon by the rod loader. The frame carries inclined cover plates 84 and 85 to prevent rods from falling down between the carriage and the frame. Each roller is fixed to a sleeve 86 which in turn is pinned to a rotatable shaft 87. There are eight rollers, best shown in Fig. 5, carried on respective shafts 87, and each of the first six shafts in sequence from the left end has two sprockets 88 fixed with respect thereto, one sprocket to receive a drive chain from the next preceding driving element, and the other sprocket to drive the next succeeding element.

The roller drive (Figs. 5, 6 and 8, and appropriate sectional views) is from motor 89 through shaft 90, coupling 91, gear reduction unit 92, chain 93, sprocket 94 (Fig. 13) pinned to shaft 95, sprocket 96 also pinned to shaft 95, chain 97, sprocket 98 on roller shaft 87, sprocket 99 on roller shaft 87, chain 100 to sprocket 101 on the next roller shaft 87a (Figs. 5 and 14) and so on as far as the second last roller shaft 87b which is driven by chain 102 from the preceding roller shaft, but does not transmit the drive further. The last roller shaft 87c (Fig. 15) is an idler shaft carrying roller 61a for a suitable purpose which will appear later.

When motor 89 is energized, it causes all rollers 61 to rotate in a direction calculated to advance to the right, a rod carried thereon. Assume that the carriage 29 has been moved so that its leading end is approximately in the position indicated by the broken line showing within mill 20 (Fig. 2). Motor 62 is then stopped and motor 89 is started. All rollers move clockwise (Figs. 2 and 6) and the rod moves to the right with its leading end progressively assuming an increasing overhang with respect to the leading end of the carriage. As the rod's center of gravity clears the end of the carriage and the rod tips as shown in Fig. 2, being now supported only by idler roll 61a, the leading end of the rod slides to contact with the mill bottom (or with the mill load of ore and rods). The carriage can now be withdrawn, idler roll travelling rearwardly on the rod's surface until the rod drops clear of the carriage and lies in the mill. The carriage continues to move rearwardly to its original position in engagement with the loading rack.

The safety locks

I show in Figs. 4, 6, 9 and 16 a safety locking device which serves two functions, namely it secures the rear end of the charging apparatus (left end in Fig. 6) to the platform, to prevent tipping, and it insures that the apparatus cannot be operated until it is secured in properly aligned position with respect to the rod mill. Although there are two such locking devices, they are identical in structure and function, and only one will be described in detail.

On the external face of a rear leg 38 are two horizontal lugs 105 and 106 which combine with the foot 38a and a head plate 107 to align and support a plunger 108. This plunger is vertically movable in a guide sleeve 109 fixed in suitable apertures in members 105, 106 and 38a. Fixed on plunger 108 is a suitable split cam bushing 110 which, when the cooperating parts thereof are in operative contact (Fig. 9) and the plunger is rotated by an operating arm 111, causes limited upward movement of the plunger.

At its lower end the plunger has a small crosspiece 114 which can be turned, by rotation of the plunger, so that a finger of the crosspiece moves beneath a flange of the platform-supporting I-beam 36 to firmly lock the charging device to the platform. Rotation of the plunger through 90 degrees around its vertical axis permits the crosspiece 114 to be aligned with a suitably oriented slot 115 in foot 38a and another slot 109a in sleeve 109, so that the plunger may be raised from the locked position of Fig. 9 to the unlocked position of Fig. 16.

In head plate 107 is a slot 116 (Figs. 4, 9 and 16) which permits upward movement therethrough of a tab or vane 117 on top of the plunger. When crosspiece 114 is in unlocked position, the tab slot 116 is properly oriented to permit tab 117 to pass through it to the position of Fig. 16. Tabs 117 are used for attachment thereto of the hooks on a chain sling as will hereinafter appear. The hooks cannot engage the tabs until crosspiece 114 is raised above the floor plate.

The safety switches

Referring to Fig. 9 I show a safety switch 118 having an operating plunger engageable by a camming finger 119 on plunger 108 when the plunger is down and turned to locking position. The switch arrangement is such that when the charging mechanism is placed in oriented position with respect to the rod mill, and manipulating arms 111 are turned to render the mechanism immovable, fingers 119 simultaneously turn to operate plungers 118 and close the contacts of switches 108, which in conjunction with other control switch devices permits energization of the various movable parts heretofore described.

The wiring diagram and operation

Referring now to the wiring diagram, Fig. 18, it will be noted that certain mechanical elements or assemblies are shown schematically.

The carriage motor 62 is reversible depending on actuation either of the forward switch SF or the reverse switch SR, each of which is responsive, respectively, to energization of the coils 131 and 148 when forward button 125 or reverse button 126 are depressed. In the diagram cam fingers 119, heretofore described, are in unlocked position and therefore safety switches 118 are open. Limit switch 129 is in open position because it has been opened by travel of carriage 37 to its extreme left or loading position. Limit switch 128 is a double pole double throw switch having an "a" position to which it is normally biased, and a "b" position to which it can be moved by the carriage as will appear. A switch 127 is provided for motor 89 for operating the rollers 61.

Assume that the charging device has been set in place and the frame 37 is locked to the floor as previously described. During the locking operation cam fingers 119 close safety switches 118. A rod is now loaded on the carriage, and the operator depresses button 125 to institute forward movement of the carriage.

The carriage motor 62 is energized through the following circuit: From $L_1$ through conductor 130, switch coil 131, conductor 132, button 125 (now closed), conductor 133 to limit switch 128 in "a" position, conductor 134, closed safety switch 118, conductor 135, closed safety switch 118, conductors 136 and 137 to $L_3$.

Energization of coil 131 starts motor 62 and the carriage moves towards the right. When it arrives in unloading position, it moves limit switch 128 from its "a" position to its "b" position, thereby breaking the circuit to motor 62, which stops.

The operator now closes the charging button 127, so called because it initiates operation of motor 89 to move the bar to charging or unloading position, as follows: From $L_1$ through conductor 140, switch coil 141 (which closes switch 142 when energized), conductor 143 to button 127, and through conductor 144 to switch 128, now in "b" position, and thence through conductors 145 and 134, closed safety switch 118, conductor 135, closed safety switch 118, conductors 136 and 137 to $L_3$.

Motor switch 142 closes the circuit to motor 89 which advances the bar to a position in which its center of gravity overhangs the carriage and the bar drops until its leading end reaches the mill floor, or the load therein. The operator then withdraws the carriage by depressing carriage reverse button 126 to close the following circuit: From $L_1$ through conductor 147, reverse switch coil 148 (which closes reverse switch SR), conductor 149 to button 126, and conductor 150, limit switch 129 in closed position, conductor 151, safety switch 118, conductor 135, safety switch 118, conductors 136 and 137 to $L_3$. Motor 62 now runs in reverse, moving the carriage 37 to the left until it breaks the just-described motor circuit by opening limit switch 129.

This completes an operating cycle.

The limit switches 129 and 128 are fixed in suitable positions on either the frame or carriage in such a way that they can be opened by an intercepting finger during movement of the carriage relative to the frame. The forward and reverse switches SF and SR for motor 62 are biased to open position, but are closed by energization of their respective coils 131 and 148 in the manner described. The switch 142 for motor 89 is likewise biased to open position, but is closed by energization of coil 141. Quite obviously the circuit shown is merely one simplified embodiment of a suitable electrical control system.

As a result of the disposition and manner of operation of the safety switches 118, these switches cannot normally be closed except by placing the plunger 108 in locked position. This means that the carriage cannot be moved in its frame except when the frame is properly positioned and aligned.

When the plunger 108 is in raised (unlocked) position, as shown in Fig. 16, vane 117 has an aperture 117a which permits insertion of a hook suspended from a travelling crane. At the rear end of the frame is a pair of spaced lugs 157 (Figs. 4 and 6) which are similarly perforated for connecting means. The assembled frame and carriage, when unlocked, can be picked up by an overhead crane and carried to a new working location adjacent to another rod mill. A similarly perforated platform or other fixed anchoring means receives the frame at all needed locations.

While the charging means hereinabove described has been shown and discussed in connection with the loading of rods into a rod mill, it is quite apparent that the essential advantages of the invention may be achieved in other applications wherein elongated elements must be charged into a relatively inaccessible hollow enclosure having a charging door or opening in the end thereof.

What I claim is:

1. Apparatus of the character described for charging an elongated article horizontally through an aperture in the end wall of an enclosure, said apparatus comprising a frame, said frame having a pair of spaced parallel tracks extending towards said aperture, an article-carrying carriage having wheels movable on said tracks whereby to permit a leading portion of said carriage to be extended through said aperture to an article-unloading position within said enclosure, said carriage having a series of rollers disposed to support said article and to unload said article, means for rotating said rollers when said carriage portion has been extended through said aperture to said unloading position, and for continuing such rotation until the center of gravity of said article is moved inwardly beyond the innermost roller, and means for thereupon withdrawing said carriage from said enclosure.

2. Apparatus as defined in claim 1 wherein reversible motor means is provided, carried on said carriage for moving said carriage from a loading position entirely outside of said enclosure, to an unloading position partially within said enclosure.

3. Apparatus as defined in claim 1 wherein means is provided for automatically stopping said carriage when it reaches unloading position.

4. Apparatus as defined in claim 2 wherein limit stop means is provided for automatically stopping said carriage at a predetermined point, both at its loading position and at its unloading position.

5. Apparatus of the character described for charging an elongated article horizontally through an aperture in the end wall of an enclosure, said apparatus comprising a supporting frame having a pair of spaced parallel tracks extending towards said aperture, an article-carrying carriage having wheels movable on said tracks whereby to permit a leading portion of said carriage to be extended through said aperture to an article-unloading position within said aperture and to be returned to an article-loading position outside said aperture, said carriage having a series of rollers disposed to support said article during movement of said carriage to unloading position and to unload said article at unloading position, an electric motor and an electric circuit for energizing said motor, said motor being operatively effective on said carriage to cause pre-selected forward or return movement thereof.

6. Apparatus of the character described for charging an elongated article horizontally through an aperture in the end wall of an enclosure, said apparatus comprising a supporting frame having a pair of spaced parallel tracks extending towards said aperture, an article-carrying carriage having wheels movable on said tracks whereby to permit a leading portion of said carriage to be extended through said aperture to an article-unloading position within said enclosure and to be returned to an article-loading position outside said aperture, said carriage having a series of rollers disposed to support said article during movement of said carriage and to unload said article at unloading position, a first electric motor and a first electric circuit for energization of said first motor, said first motor being operatively effective on said carriage to cause selected forward or return movement thereof when said circuit is completed, and a second electric motor and a second electric circuit for energization of said second motor, said second motor being operatively effective on said rollers to produce article-unloading rotation thereof when said carriage is moved to unloading position.

7. Apparatus of the character described for charging an elongated article horizontally through an aperture in the end wall of an enclosure, said apparatus comprising a supporting frame having a pair of spaced parallel tracks extending towards said aperture, an article-carrying carriage having wheels movable on said tracks whereby to permit a leading portion of said carriage to be extended through said aperture to an article-unloading position within said aperture and to be returned to an article-loading position outside said aperture, said carriage having a series of rollers disposed to support said article during movement of said carriage to unloading position and to unload said article at unloading position, a first electric motor and a first electric circuit for energizing said motor, means establishing an operative linkage between said first motor and said carriage whereby to advance or retract said carriage between said loading and unloading positions, a second electric motor and a second electric circuit for energizing said second motor, means establishing an operative linkage between said second motor and said rollers to produce unloading rotation of said rollers when desired, said supporting frame being transportable into and out of working position in alignment with said aperture, movable means for locking said frame in said working position, normally open safety switch means in series in said first circuit, and means operatively responsive to locking movement of said locking means and effective, upon such locking movement, to close said safety switch means whereby said first motor is energizable only when said supporting frame is locked in working position.

8. Apparatus as defined in claim 7 wherein limit switch means is provided in said first circuit, said limit switch means being effective to interrupt said first circuit and stop movement of said carriage when it reaches a predetermined limit of travel in either direction.

9. Apparatus as defined in claim 8 wherein said safety switch means and said limit switch means are disposed in series in said first electric circuit so that opening of either the safety switch means or the limit switch means renders said first circuit ineffective to energize said first motor.

10. Apparatus as defined in claim 7 wherein the roller adjacent the leading end of the carriage is an idler roller, and the rest of the rollers are driven by said second motor.

11. Apparatus as defined in claim 7 wherein said supporting frame is provided with a second pair of spaced parallel tracks extending towards said aperture, and the end of said carriage remote from said enclosure is provided with a pair of wheels in rolling contact with the lower faces of said second pair of tracks.

12. Apparatus of the character described for charging an elongated article horizontally through an aperture in the end wall of an enclosure, said apparatus comprising a supporting frame having a pair of spaced parallel tracks extending towards said aperture, an article-carrying carriage having wheels movable on said tracks whereby to permit a leading portion of said carriage to be extended through said aperture to an article-unloading position within said aperture and to be returned to an article-loading position outside said aperture, said carriage having a series of rollers disposed to support said article during movement of said carriage to unloading position and to unload said article at unloading position, an electric motor and an electric circuit for energizing said motor, said motor being operatively effected on said carriage to cause pre-selected forward or return movement thereof, said supporting frame being transferable into and out of a working position in alignment with said aperture, movable means for locking said frame in said working position, normally open safety switch means in series in said circuit, and means operatively responsive to locking movement of said locking means and effective, upon such locking movement, to close said safety switch means whereby said motor is energizable only when said supporting frame is locked in working position.

References Cited in the file of this patent

UNITED STATES PATENTS

| | | |
|---|---|---|
| 1,641,651 | Wulf | Sept. 6, 1927 |
| 2,106,469 | Seil | Jan. 25, 1938 |
| 2,410,492 | Garrow | Nov. 5, 1946 |
| 2,630,909 | Mariotte | Mar. 10, 1953 |
| 2,744,616 | Shields | May 8, 1956 |